US012659228B2

(12) United States Patent
Sumedrea et al.

(10) Patent No.: US 12,659,228 B2
(45) Date of Patent: Jun. 16, 2026

(54) USING LARGE LANGUAGE MODELS TO RECOMMEND AND VALIDATE ASSET AND/OR CLOUD CONFIGURATIONS

(71) Applicant: CrowdStrike, Inc., Sunnyvale, CA (US)

(72) Inventors: Paul Sumedrea, Bucharest (RO); Damian Monea, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 5 days.

(21) Appl. No.: 18/405,749

(22) Filed: Jan. 5, 2024

(65) Prior Publication Data

US 2025/0023779 A1     Jan. 16, 2025

Related U.S. Application Data

(60) Provisional application No. 63/513,291, filed on Jul. 12, 2023.

(51) Int. Cl.
H04L 41/084          (2022.01)
G06F 40/20           (2020.01)

(52) U.S. Cl.
CPC ............ H04L 41/084 (2013.01); G06F 40/20 (2020.01)

(58) Field of Classification Search
CPC ............... H04L 41/084; H04L 41/0894; H04L 41/0895; H04L 41/145; H04L 41/16; G06F 40/20
USPC ....................................................... 709/224
See application file for complete search history.

(56) References Cited

U.S. PATENT DOCUMENTS

| | | | | |
|---|---|---|---|---|
| 11,392,844 B1 * | 7/2022 | Rao | ..................... | G06F 11/3698 |
| 12,007,877 B1 * | 6/2024 | Garg | ................... | G06F 11/3698 |
| 12,045,609 B1 * | 7/2024 | Sawant | .................. | G06F 40/20 |
| 12,052,206 B1 * | 7/2024 | Lai | ....................... | G06Q 50/205 |
| 2021/0223982 A1 * | 7/2021 | Prado | ................. | G06F 11/3419 |
| 2021/0241337 A1 * | 8/2021 | Bikumala | ............... | G06F 40/30 |
| 2022/0247638 A1 * | 8/2022 | Engi | ..................... | G06N 20/00 |
| 2023/0006880 A1 * | 1/2023 | Kaufman | ........... | H04L 41/0816 |
| 2023/0350722 A1 * | 11/2023 | Poornachandran | ... | G06F 9/4881 |
| 2024/0007504 A1 * | 1/2024 | Triplet | ............... | H04L 41/0869 |
| 2024/0177049 A1 * | 5/2024 | Ramakrishnan | ....... | G06N 20/00 |
| 2024/0184979 A1 * | 6/2024 | Singh | ................... | G06F 16/355 |
| 2024/0331071 A1 * | 10/2024 | Ouellette | .............. | G08B 13/08 |
| 2024/0333671 A1 * | 10/2024 | Bodke | .................... | H04L 51/42 |
| 2024/0377792 A1 * | 11/2024 | Brown | ................. | G05B 13/027 |
| 2024/0385831 A1 * | 11/2024 | Sistu | .................... | G06N 20/00 |
| 2024/0403776 A1 * | 12/2024 | Krishna | ........... | G06Q 10/06375 |

* cited by examiner

*Primary Examiner* — Karen C Tang

(74) *Attorney, Agent, or Firm* — Womble Bond Dickinson (US) LLP

(57)          ABSTRACT

A system and method of using generative AI to recommend and validate asset and/or cloud configurations. The method includes acquiring a set of parameters associated with one or more network entities of a computing network. The method includes providing the set of parameters to a configuration model trained to generate, based on semantic matching, recommended configurations for network entities and validated configurations for the network entities. The method includes generating, by a processing device using the configuration model, one or more recommended configurations for the one or more network entities based on the set of parameters.

20 Claims, 6 Drawing Sheets

400 acquiring a set of parameters associated with one or more network entities of a computing network
402 providing the set of parameters to a configuration model trained to generate, based on semantic matching, recommended configurations for network entities
404 generating, by a processing device using the configuration model, one or more recommended configurations for the one or more network entities based on the set of parameters
406

400

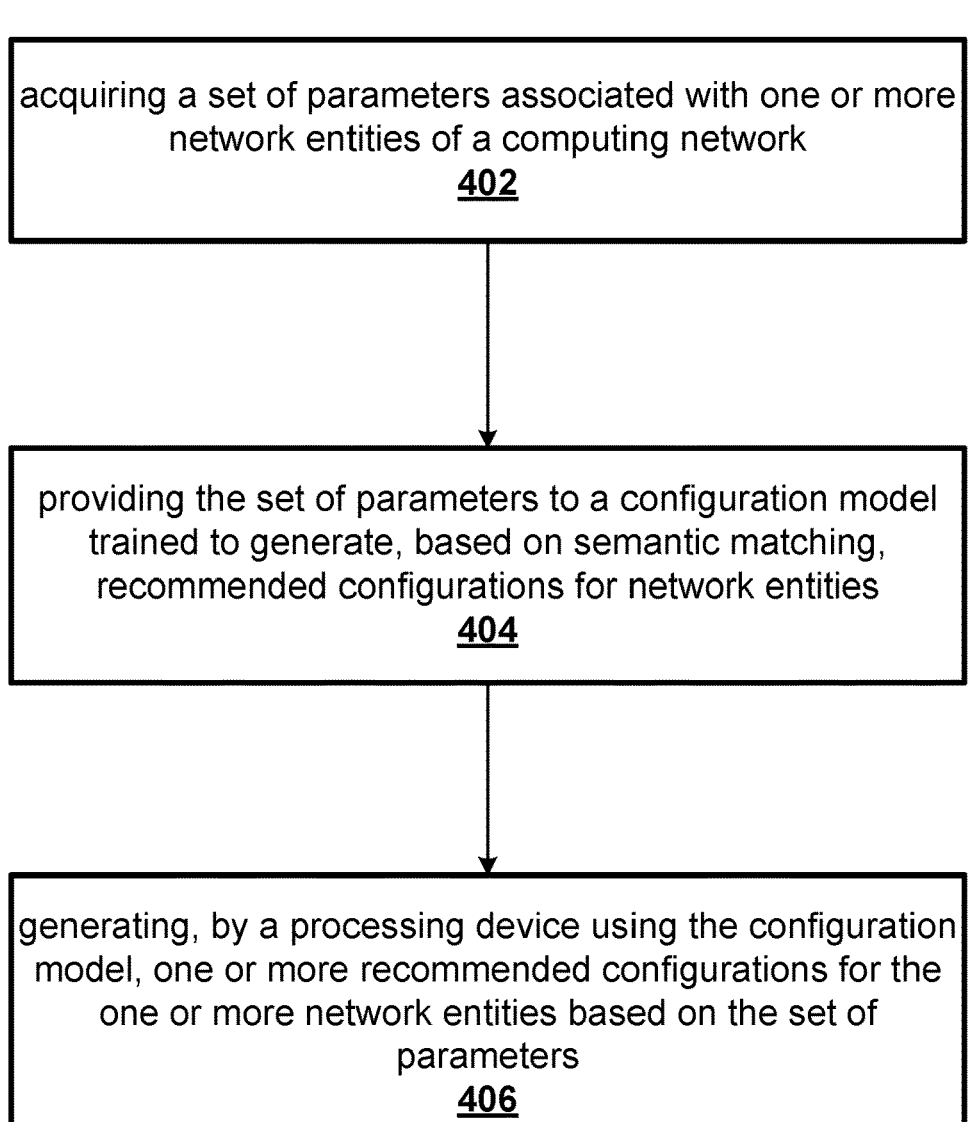

acquiring a set of parameters associated with one or more network entities of a computing network
402 providing the set of parameters to a configuration model trained to generate, based on semantic matching, recommended configurations for network entities
404 generating, by a processing device using the configuration model, one or more recommended configurations for the one or more network entities based on the set of parameters
406

FIG. 4

USING LARGE LANGUAGE MODELS TO RECOMMEND AND VALIDATE ASSET AND/OR CLOUD CONFIGURATIONS

This application claims the benefit of U.S. Provisional Application Ser. No. 63/513,291 entitled "USING LARGE LANGUAGE MODELS TO RECOMMEND AND VALIDATE ASSET AND/OR CLOUD CONFIGURATIONS," filed Jul. 12, 2023, the disclosure of which is incorporated herein by reference in its entirety.

TECHNICAL FIELD

Technical Field

The present disclosure relates generally to cyber security, and more particularly, to systems and methods of using generative artificial intelligence (AI), such as large language models (LLMs), to recommend and validate asset and/or cloud configurations.

Background

An asset cloud is a centralized digital storage facility that operates over the internet. The vast majority of businesses today use either cloud software or cloud services for keeping track of company equipment, also referred to as assets. An asset includes the hardware, software, and networking entities that a company has as tools and resources for their objectives.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram depicting a method of using generative artificial intelligence to recommend and validate asset and/or cloud configurations, according to some embodiments.

DETAILED DESCRIPTION

Figure 1:
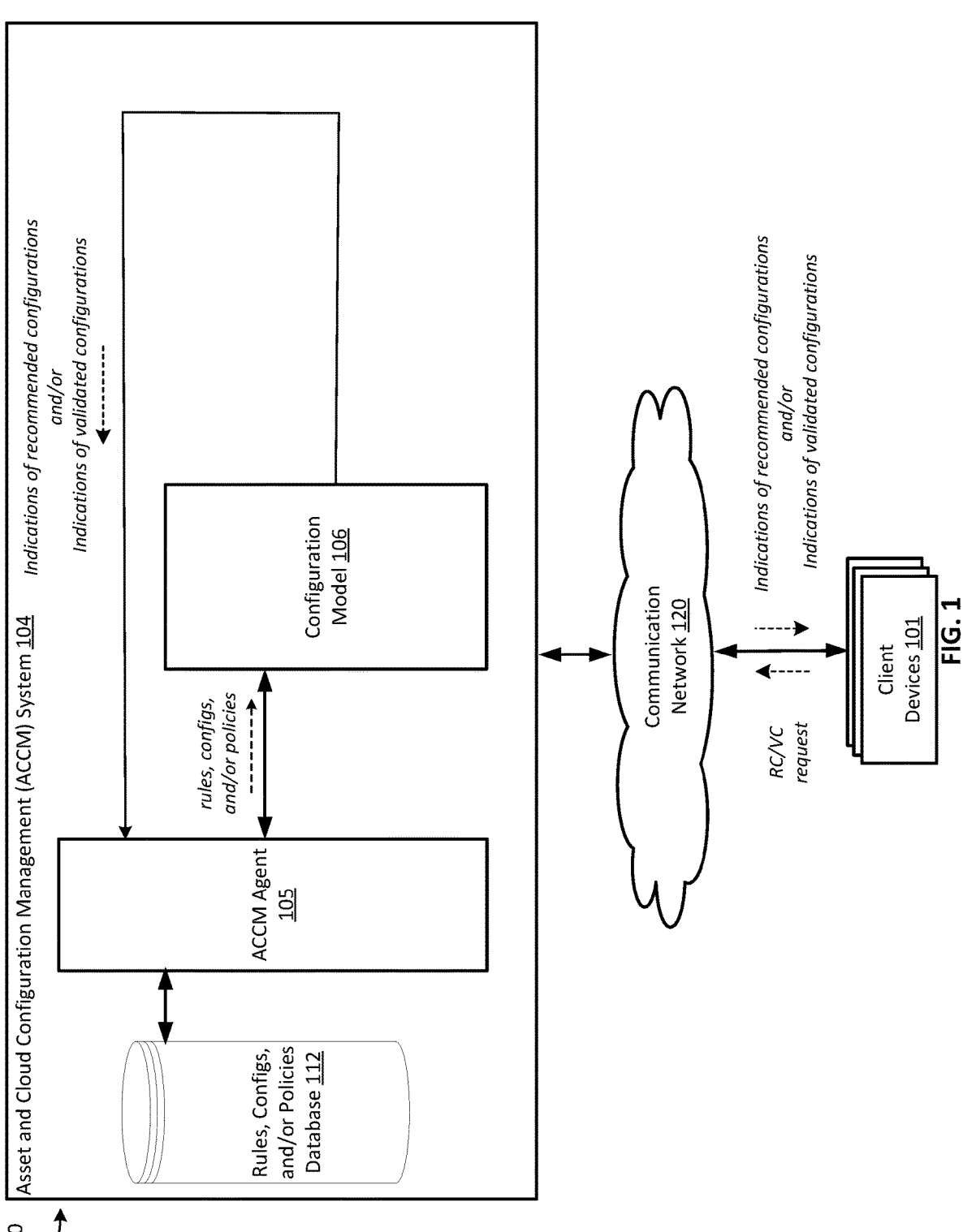
FIG. 1 is a block diagram depicting an example environment for using generative artificial intelligence to recommend and validate asset and/or cloud configurations, according to some embodiments.

An asset includes the hardware (e.g., computing devices, databases, and/or the like), software (e.g., applications, firewalls, and/or the like), and networking entities (e.g., routers, switches, and/or the like) that a company has as tools and resources for their objectives. A centralized asset management system helps organizations configure security policies (e.g., managing access key rotation and rollback/backup policies), list users as part of particular access groups or individual resources, configure various levels of logging or encryption, and configure alarms in case certain events occur.

However, the diversity of asset types and their sheer volume, even in small or medium organizations, can make asset management a challenging task. Oftentimes, system administrators have a difficult time keeping track of all the new vulnerabilities (e.g., threats, malicious activity) which are constantly appearing and need to handle high volumes of access requests and/or new asset configurations. Moreover, many organizations which are part of the same business vertical (e.g., a market encompassing a group of companies and customers that are all interconnected around a specific niche) comply with particular sets of standards in order to meet compliance and security audits or otherwise risk losing certification.

Currently, recommendations can only be made in terms of a single rule and consist of suggestions to mitigate particular bugs which would prevent the configuration to run or could come in the form of hardcoded suggestions which promote restricting access as much as possible to/for a particular entity. Writing bad configurations opens up the door to attackers. Given that validating these configurations is a whole problem on its own with its particular set of challenges, it could be preferable to make writing configuration changes be an informed/proactive process geared towards enforcing best practices depending on the particular context in which the user finds themselves in regardless of their experience level.

Another problem is that failing to validate that an asset is properly configured opens up the door to a wide range of security incidents. That is, validating asset configurations is mostly based on rules. Keeping track of the plethora of rules requires storing them in a database and checking them one by one depending on the task at hand. This validation process is complex, ranging from checking the validity of entities included in the configuration file as well as the relationships between them (e.g., one cannot compare an entity with string type values against a floating point number). Besides static checks, the validation process can enforce more restrictive access permissions by correlating various information around a particular entity, but these security checks need to be manually defined depending on the asset type. Managing such a system is difficult and suffers from scalability issues. Furthermore, the decision to allow or deny a particular configuration is ultimately taken by a human who needs to have a broad context around the business problem as well as the security knowledge to understand its implications.

Aspects of the present disclosure address the above-noted and other deficiencies by using generative artificial intelligence (e.g., an LLM, Recurrent Neural Network, text generating model based on diffusion techniques) to recommend and validate asset and/or cloud configurations. The present disclosure provides a mechanism for building a system that recommends a new asset configuration on premise and/or in the cloud (e.g., Identity and Access Management (IAM) policy changes, Active Directory or firewall management rules) to replace a misconfigured asset configuration (e.g., wrong account info, wrong networking settings, and/or the like) or to introduce a new asset configuration for a new asset to a computing network (e.g., a cloud). Furthermore, the present disclosure aims to enforce an organization's asset configuration plan by enforcing continuous security control validation through the power of machine learning. This solution can go over assets in an environment and validate they are properly configured, or it can do so intelligently, such as by taking advantage of signals from external systems (such as an asset criticality model, an anomalous authentication model over data from an identity platform or from an external attack surface management tool highlighting which assets are exposed to the internet) in order to gain eternal context around the implications around a particular asset configuration/access management policy change. Examples disclosed herein help a network administrator (e.g., Information Technology (IT) teams) to keep up with their workload more efficiently.

In an illustrative embodiment, an asset and cloud configuration management (ACCM) system acquires (e.g., retrieves, receives) a set of parameters (e.g., rules, configurations, and/or policies), associated with one or more network entities of a computing network. The ACCM system provides the set of parameters to a configuration management model trained to generate, based on semantic matching, recommended configurations (e.g., rules, policies, settings, and/or the like) for network entities and validated configurations for the network entities. The ACCM system generates, using the configuration management model, one or more recommended configurations for the one or more network entities based on the set of parameters.

FIG. 1 is a block diagram depicting an example environment for using generative artificial intelligence to recommend and validate asset and/or cloud configurations, according to some embodiments. The environment 100 includes and/or executes an asset and cloud configuration management (ACCM) system 104, and client devices 101 that are communicably coupled together via a communication network 120. The ACCM system 104 includes and/or executes an ACCM agent 105, a configuration model 106, and a rules, configurations, and/or policies database 112. In some embodiments, the configuration model 106 may be a large language model (LLM).

The ACCM agent 105 trains the configuration model 106 to generate, based on semantic matching, recommended configurations for network entities and validated configurations for the network entities. The ACCM agent 105 may receive a request from the client device 101 to generate recommended configurations for network entities and/or validated configurations for the network entities. The request may indicate a set (e.g., one or more) of parameters associated with one or more network entities of a computing network (e.g., a private network, a corporate network, a customer's network, a public network, and/or the like). A parameter may be a rule, a configuration, or a policy. The ACCM agent 105 may retrieve the one or more parameters from the rules, configurations, and/or policies database 112. In some embodiments, the request may include the one or more parameters. The ACCM agent 105 provides the set of parameters to the configuration model 106 model to cause the configuration model 106 model to generate one or more recommended configurations for the one or more network entities based on the set of parameters. The ACCM agent 105 provides the one or more recommended configurations to the client device 101.

Although FIG. 1 shows only a select number of computing devices (e.g., ACCM system 104, client device 101), the environment 100 may include any number of computing devices that are interconnected in any arrangement to facilitate the exchange of data between the computing devices.

Figure 2:
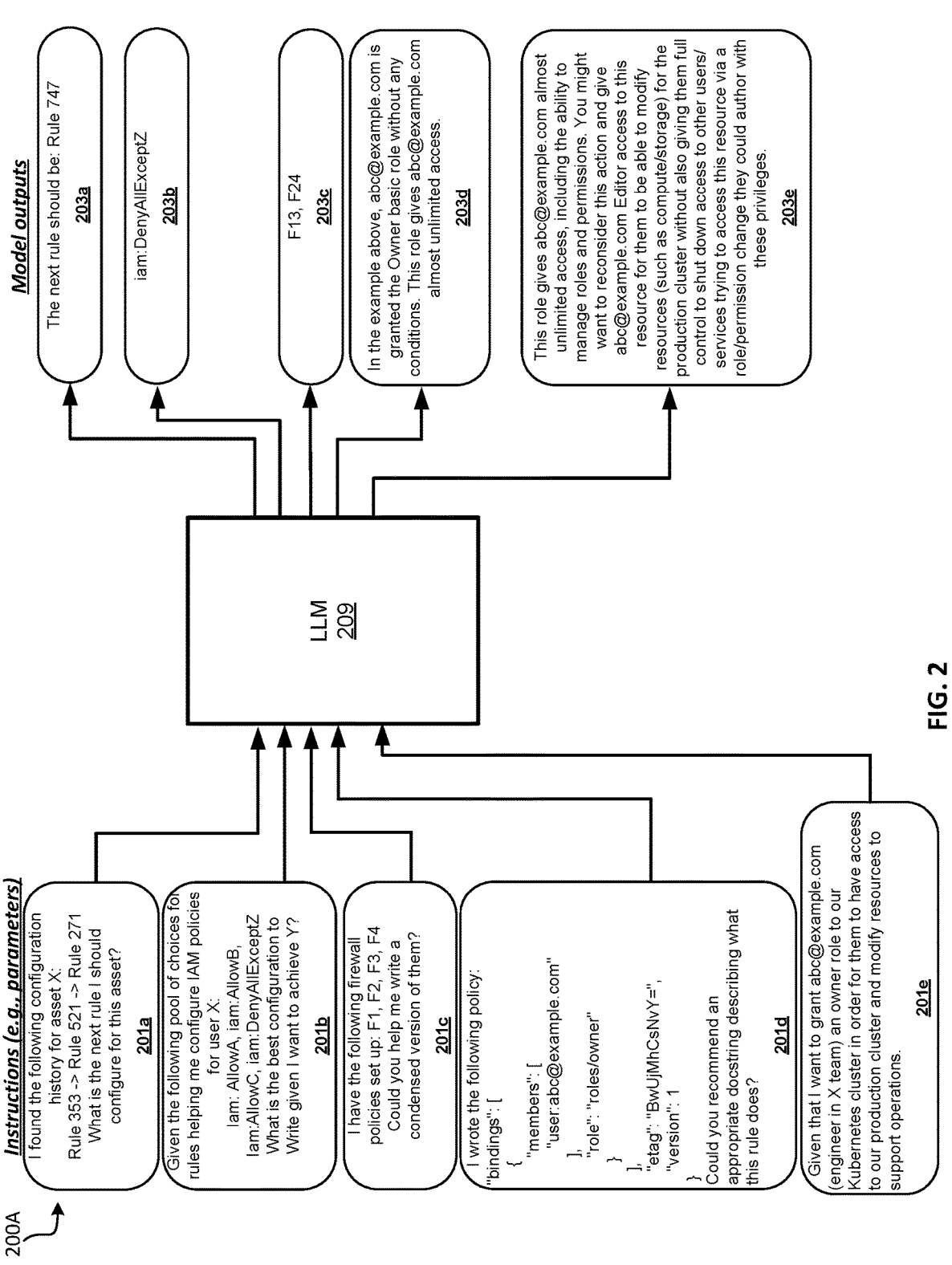
FIG. 2 is a block diagram depicting an example environment for using an LLM to recommend and validate asset and/or cloud configurations, according to some embodiments.

FIG. 2 is a block diagram depicting an example environment for using an LLM to recommend and validate asset and/or cloud configurations, according to some embodiments. The LLM 209 in FIG. 2 may be included in the ACCM system 104 in FIG. 1. For example, the LLM 209 may correspond to the configuration model 106 in FIG. 1. The ACCM agent 105 trains the LLM 209 to generate, based on semantic matching, recommended configurations for network entities and validated configurations for the network entities.

FIG. 2 shows a series of example instructions (e.g., rules, configurations, and/or policies) that the ACCM agent 105 can provide to the LLM 209 to cause the LLM 209 to generate a model output indicative of recommended configurations for network entities and validated configurations for the network entities. For example, the ACCM agent 105 may provide one or more instruction 201 (e.g., 201a, 201b, 201c, 201d, 201e) to cause the LLM 209 to generate one or more model outputs 203 (e.g., 203a, 203b, 203c, 203d, 203e).

The ACCM agent 105 may use the LLM 209 to generate a recommendation based on a previously authored configuration/rule, where the recommendation indicates the next action to take. For example, the ACCM agent 105 may generate or obtain an instruction 201a, which indicates the following: "I found the following configuration history for asset X: Rule 353→Rule 521→Rule 271. What is the next rule I should configure for this asset?". The ACCM agent 105 may provide the instruction 201a to the LLM 209 to cause the LLM 209 to generate model output 203a, where the model output 203a includes an indication that recommends the next action to take. For example, the model output 203a may state "based on your previously authored configuration rules your next rule should be: Rule 747".

The ACCM agent 105 may use the LLM 209 to generate a recommendation based on one or more policies, where the recommendation indicates the best action to take given a particular pool of choices. For example, the ACCM agent 105 may generate or obtain an instruction 201b, which indicates the following: "Given the following pool of choices for rules helping me configure IAM policies for user X: iam: AllowA, iam: AllowB, iam: AllowC, iam: Deny AllExceptZ. What is the best configuration to write given I want to achieve Y?" The ACCM agent 105 may provide the instruction 201b to the LLM 209 to cause the LLM 209 to generate model output 203b, where the model output 203b includes an indication that recommends the best action to take given a particular pool of choices. For example, the model output 203b may state "iam: Deny AllExceptA"

The ACCM agent 105 may use the LLM 209 to generate a recommendation that indicates an aggregate rule which compiles a set of given rules the user has thought about writing and/or already has deployed. Indeed, writing fewer/more concise rules can help professionals more easily manage the growing number of templates they have deployed. For example, the ACCM agent 105 may generate or obtain an instruction 201c, which indicates the following: "I have the following firewall policies set up: F1, F2, F3, F4. Could you help me write a condensed version of them?" The ACCM agent 105 provides the instruction 201c to the LLM 209 to cause the LLM 209 to generate model output 203c, where the model output 203c includes an indication that recommends an aggregate rule which compiles a set of given rules the user has thought about writing/already has deployed. For example, the model output 203c may state "F13, F24". Thus, writing fewer/more concise rules can help professionals more easily manage the growing number of templates they have deployed.

The ACCM agent 105 may use the LLM 209 to generate a recommendation indicating a docstring (e.g., a string literal specified in source code that is used, like a comment, to document a specific segment of code) to append to a particular rule in order to aid identification as well as describe what the rule is responsible for. For example, the ACCM agent 105 may generate or obtain an instruction 201*d*, which indicates the following:

---

I wrote the following policy:
```
    "bindings": [
            }
                "members": [
                    "user:abc@example.com"
                ],
                "role": "roles/owner"
            }
        ],
        "etag": "BwUjMhCsNvY=",
        "version": 1
    }
```
Could you recommend an appropriate docstring describing what this rule does?

---

The ACCM agent 105 provides the instruction 201*d* to the LLM 209 to cause the LLM 209 to generate model output 203*d*, where the model output 203*d* includes an indication that recommends docstring to append to a particular rule in order to aid identification as well as describe what the rule is responsible for. For example, the model output 203*d* may state "In the example above, abc@example.com is granted the Owner basic role without any conditions. This role gives abc@example.com almost unlimited access."

The ACCM agent 105 may provide a different set of parameters to LLM 209 to cause the LLM 209 to generate a model output indicating whether the different set of parameters achieve a desired objective. For example, the ACCM agent 105 may generate or obtain an instruction 201*e*, which indicates the following: "Given that I want to grant abc@example.com (engineer in X team) an owner role to our Kubernetes cluster in order for them to have access to our production cluster and modify resources to support operations." The ACCM agent 105 may provide the instruction 201*e* to the LLM 209 to cause the LLM 209 to generate model output 203*e*, where the model output 203*e* indicates "This role gives abc@example.com almost unlimited access, including the ability to manage roles and permissions. You might want to reconsider this action and give abc@example.com Editor access to this resource for them to be able to modify resources (such as compute/storage) for the production cluster without also giving them full control to shut down access to other users/services trying to access this resource via a role/permission change they could author with these privileges."

For this purpose, the ACCM agent 105 builds (e.g., trains) a multi-task model based on a pre-trained LLM that the ACCM agent 105 fine-tunes using instructions/prompts. The dataset represents sample inputs which are composed of a task description and one or multiple configuration rules given as context along with the desired output. This model may be general purpose, containing security best practice recommendations for all types of organizations. The ACCM agent 105 may train the model in a supervised fashion and late tune the model to optimize a particular policy, either human or AI generated (e.g., from another recommendation model based on collaborative filtering with or without any form of Bayesian priors or perhaps a model trained on content based filtering—by taking into account the particularities of a customer's environment; these models can have all types of architectures, ranging from simple neural networks to Graph Neural Networks (GNNs)).

Moreover, this recommendation model can be fine-tuned for a particular business vertical through various parameter efficient techniques (e.g., adapter layers among others) in order to suggest best practices across industry verticals and help organizations comply with their particular set of industry standards by allowing them to learn from other members with the same business context, whose knowledge has been embedded in the model weights after training.

Thus, recommender systems represent a new frontier for configuration management. Constructing a promptable recommender system moves beyond simply recommending a good/beneficial action to take and instead aims to empower the user to take proactive steps in improving their security posture. Integrating a wide range of possible actions into the same model allows providers to minimize deployment costs by integrating multiple functionalities into the same model given the fact that all of them represent promptable actions which can be executed by a single multi-task large language model.

Additional Detail Validating Asset/Cloud Configurations:

The ACCM agent 105 builds (e.g., trains) a machine learning model (e.g., LLM) on various configuration rules coming from sources such as Active Directory (in the form of PowerShell commands/scripts for identity and access management), shell/cmd commands (e.g., for firewall configurations, remote Internet of Things (IoT) device configuration management) and configuration management commands from various cloud providers (e.g., Amazon Web Services (AWS), Google Cloud Platform (GCP), Azure which can come in the form of Application Programming Interface (API) calls or plain commands/scripts used to set up various IAM roles) as well as documentation/comments around all these asset configuration rules. The initial training is conducted in a self-supervised fashion and later the model is fine-tuned to explain the outcome of applying these rules in a particular environment. This training is conducted in a supervised fashion where the model is fine-tuned based to produce explanations for each of the rules it receives as input, where the explanations describe the outcome of running a particular configuration rule. Apart from the configuration rule needing to be explained, the model also includes an asset configuration plan to be followed as additional context. This plan can include current permissions a particular user has, what groups they are part of, and/or various other restrictions which are imposed on various assets due to the business logic. The explanation can also include an expected outcome, such as an indication as to whether the configuration rule is valid or invalid in this context given the plan.

Given that each customer environment is different and asset configuration plans may vary, the model can be additionally fine-tuned using various parameter efficient techniques to cater to the particulars of the target environment or can be used as is and prompted with a new configuration plan to follow at each interrogation.

During deployment, the ACCM agent 105 can cache the configuration plan, either by saving it in memory and appending it to each rule requiring validation or by deploying a modified version of the model which incorporates this plan by saving the model weights/model context right after the prompt is imputed with this plan. In order to achieve this purpose, one could for example perform some sort of additional prompt/prefix tuning to the model before the actual deployment. This modification will help speed up the inference process as well as allowing for larger scripts/command lines to be validated without requiring a change in architecture. Also, during deployment, the model can be prompted to just validate or invalidate the rule, or it can also generate an explanation for why it took this decision. Additionally, the model can be prompted with some more few-shot (e.g., step by step) examples along with the actual rule to be validated in order to provide the output in the desired format. If a particular plan impacts other already defined rules besides a particular current one, these rules can be identified via their text embeddings and can be re-validated according to the new plan by being inputted again through the model.

Thus, the embodiments of the present disclosure provide several novel features. For example, the present embodiments automate the validation process as well as learning to generate an appropriate description of what the configuration change entails (both as an outcome as well as from a security perspective) represent elements of novelty. The present embodiments provide the ability to reason around a configuration change automatically without being explicitly programmed and also considering external factors in the process. Using LLMs or any other generative machine learning models allows an unprecedented level of customization to asset configuration management, allowing admins to specify a plan to be followed and having users be presented with explanations which take this context into account without the need to explicitly program these interactions but instead relying on demonstrations. Such an approach helps mitigate scalability issues and allows easier block changes to various configurations and IAM policies.

Figures 3A, 3B:
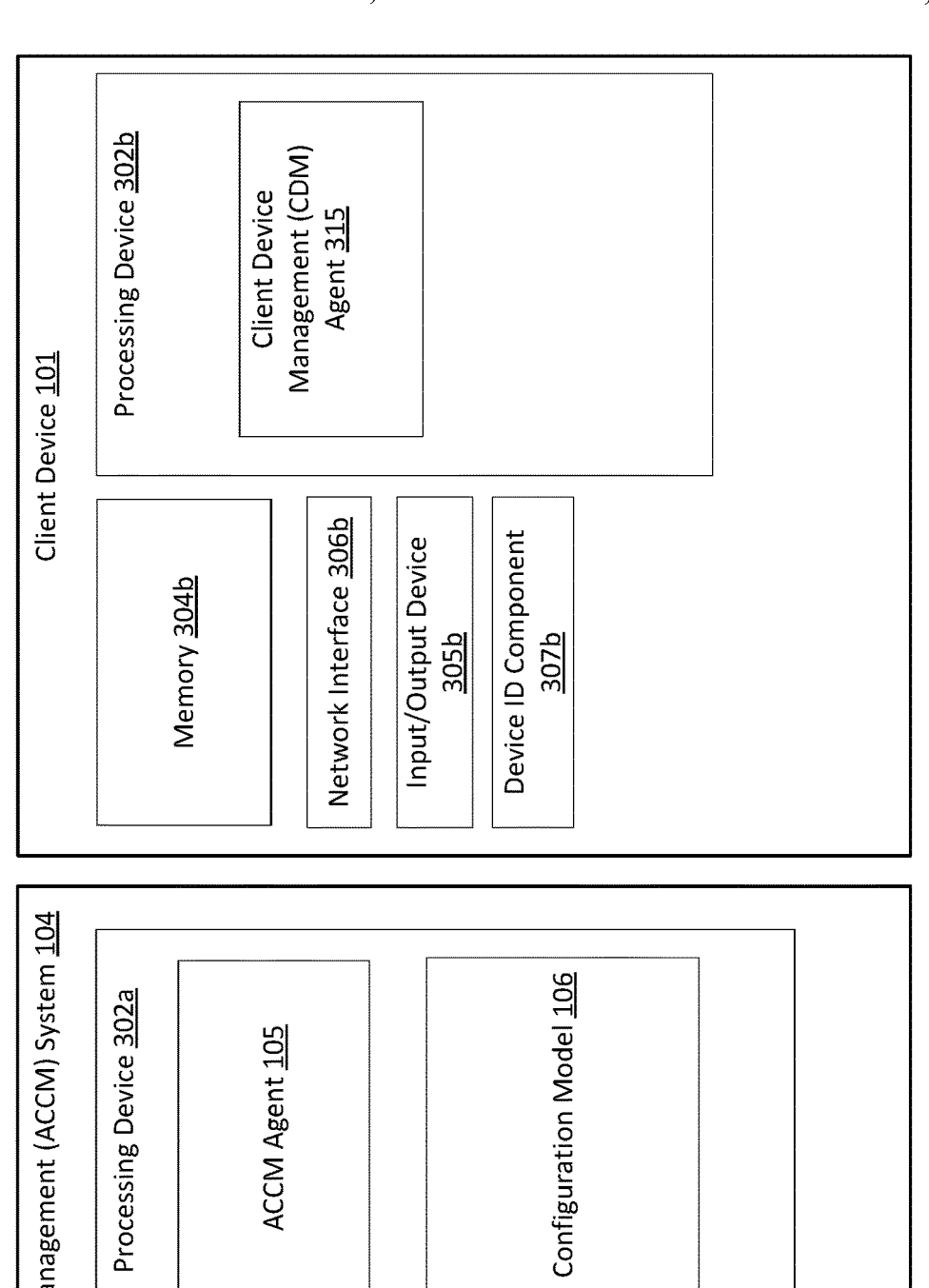
FIG. 3A is a block diagram depicting an example of the asset and cloud configuration management (ACCM) system in FIG. 1, according to some embodiments.
FIG. 3B is a block diagram depicting an example of the client device in FIG. 1, according to some embodiments.

FIG. 3A is a block diagram depicting an example of the asset and cloud configuration management (ACCM) system in FIG. 1, according to some embodiments. While various devices, interfaces, and logic with particular functionality are shown, it should be understood that the ACCM system 104 includes any number of devices and/or components, interfaces, and logic for facilitating the functions described herein. For example, the activities of multiple devices may be combined as a single device and implemented on the same processing device (e.g., processing device 302$a$), as additional devices and/or components with additional functionality are included.

The ACCM system 104 includes a processing device 302$a$ (e.g., general purpose processor, a PLD, etc.), which may be composed of one or more processors, and a memory 304$a$ (e.g., synchronous dynamic random-access memory (DRAM), read-only memory (ROM)), which may communicate with each other via a bus (not shown).

The processing device 302$a$ may be provided by one or more general-purpose processing devices such as a microprocessor, central processing unit, graphic processing unit (GPU), or the like. In some embodiments, processing device 302$a$ may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 302$a$ may include one or more special-purpose processing devices such as an application specific integrated circuit (ASIC), a field programmable gate array (FPGA), a digital signal processor (DSP), network processor, or the like. The processing device 302$a$ may be configured to execute the operations described herein, in accordance with one or more aspects of the present disclosure, for performing the operations and steps discussed herein.

The memory 304$a$ (e.g., Random Access Memory (RAM), Read-Only Memory (ROM), Non-volatile RAM (NVRAM), Flash Memory, hard disk storage, optical media, etc.) of processing device 302$a$ stores data and/or computer instructions/code for facilitating at least some of the various processes described herein. The memory 304$a$ includes tangible, non-transient volatile memory, or non-volatile memory. The memory 304$a$ stores programming logic (e.g., instructions/code) that, when executed by the processing device 302$a$, controls the operations of the ACCM system 104. In some embodiments, the processing device 302$a$ and the memory 304$a$ form various processing devices and/or circuits described with respect to the ACCM system 104. The instructions include code from any suitable computer programming language such as, but not limited to, C, C++, C#, Java, JavaScript, VBScript, Perl, HTML, XML, Python, TCL, and Basic.

The processing device 302$a$ executes a ACCM agent 105 and a configuration model 106. The configuration model 106 is trained to generate, based on semantic matching, recommended configurations for network entities and validated configurations for the network entities. The ACCM system 104 includes a rules, configurations, and/or policies database 112.

The ACCM agent 105 may be configured to acquire a set of parameters that are associated with one or more network entities (e.g., client devices 101, routers, servers, host machines, network switches, databases, and/or the like) of a computing network. The set of parameters may include, for example, a network rule, a network configuration, and/or a network policy. The ACCM agent 105 may acquire the set of parameters by receiving, from the client device 101, a request (shown in FIG. 1 as RC/VC request) for recommended configurations and/or validated configurations for the network entities, where the request includes the set of parameters. The ACCM agent 105 may be configured to provide the set of parameters to the configuration model 106. The configuration model 106 may be configured to generate one or more recommended configurations for the one or more network entities based on the set of parameters.

In some embodiments, the configuration model 106 may be configured to generate one or more recommended configurations by determining a desired outcome based on the set of parameters, determining a plurality of actions to cause the desired outcome, and identifying a subsequent action of the plurality of actions based on a chronological order. The one or more recommended configurations may indicate the subsequent action.

In some embodiments, the configuration model 106 may be configured to generate one or more recommended configurations by identifying a pool (e.g., a plurality) of configuration rules for one or more policies and selecting a best (e.g., optimal) configuration rule for the one or more policies from the pool of configuration rules.

In some embodiments, the configuration model 106 may be configured to generate one or more recommended configurations by condensing the set of parameters into fewer parameters that are still indicative of the set of parameters. The one or more recommended configurations may indicate the fewer parameters.

In some embodiments, the configuration model 106 may be configured to generate one or more recommended configurations by generating one or more natural language strings describing the set of parameters. The configuration model 106 may be configured to generate a file including the one or more natural language strings and provide the file to the client device 101.

The ACCM agent 105 may be configured to provide a different set of parameters to the configuration model 106. The configuration model 106 may be configured to generate a model output indicating whether the different set of parameters achieve a desired objective. The configuration model 106 may be configured to generate a model output by determining whether the different set of parameters achieve the desired objective. The configuration model 106 may indicate, in the model output, that the different set of parameters is a valid configuration responsive to determining that the different set of parameters achieve the desired objective. The configuration model 106 may indicate, in the model output, that the different set of parameters is an invalid configuration responsive to determining that the different set of parameters fail to achieve the desired objective.

The configuration model 106 may be configured to generate a reason (e.g., explanation) for why the configuration model 106 generated the one or more recommended configurations.

The ACCM system 104 includes a network interface 306a configured to establish a communication session with a computing device for sending and receiving data over the communication network 120 to the computing device. Accordingly, the network interface 306a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the ACCM system 104 includes a plurality of network interfaces 306a of different types, allowing for connections to a variety of networks, such as local area networks (public or private) or wide area networks including the Internet, via different sub-networks.

The ACCM system 104 includes an input/output device 305a configured to receive user input from and provide information to a user. In this regard, the input/output device 305a is structured to exchange data, communications, instructions, etc. with an input/output component of the ACCM system 104. Accordingly, input/output device 305a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the ACCM system 104, such as a built-in display, touch screen, microphone, etc., or external to the housing of the ACCM system 104, such as a monitor connected to the ACCM system 104, a speaker connected to the ACCM system 104, etc., according to various embodiments. In some embodiments, the ACCM system 104 includes communication circuitry for facilitating the exchange of data, values, messages, and the like between the input/output device 305a and the components of the ACCM system 104. In some embodiments, the input/output device 305a includes machine-readable media for facilitating the exchange of information between the input/output device 305a and the components of the ACCM system 104. In still another embodiment, the input/output device 305a includes any combination of hardware components (e.g., a touchscreen), communication circuitry, and machine-readable media.

The ACCM system 104 includes a device identification component 307a (shown in FIG. 3A as device ID component 307a) configured to generate and/or manage a device identifier associated with the ACCM system 104. The device identifier may include any type and form of identification used to distinguish the ACCM system 104 from other computing devices. In some embodiments, to preserve privacy, the device identifier may be cryptographically generated, encrypted, or otherwise obfuscated by any device and/or component of the ACCM system 104. In some embodiments, the ACCM system 104 may include the device identifier in any communication (e.g., classifier performance data, input message, parameter message, etc.) that the ACCM system 104 sends to a computing device.

The ACCM system 104 includes a bus (not shown), such as an address/data bus or other communication mechanism for communicating information, which interconnects the devices and/or components of the ACCM system 104, such as processing device 302a, network interface 306a, input/output device 305a, and device ID component 307a.

In some embodiments, some or all of the devices and/or components of ACCM system 104 may be implemented with the processing device 302a. For example, the ACCM system 104 may be implemented as a software application stored within the memory 304a and executed by the processing device 302a. Accordingly, such embodiment can be implemented with minimal or no additional hardware costs. In some embodiments, any of these above-recited devices and/or components rely on dedicated hardware specifically configured for performing operations of the devices and/or components.

FIG. 3B is a block diagram depicting an example of the client device in FIG. 1, according to some embodiments. While various devices, interfaces, and logic with particular functionality are shown, it should be understood that the client device 101 includes any number of devices and/or components, interfaces, and logic for facilitating the functions described herein. For example, the activities of multiple devices may be combined as a single device and implemented on a same processing device (e.g., processing device 302b), as additional devices and/or components with additional functionality are included.

The client device 101 includes a processing device 302b (e.g., general purpose processor, a PLD, etc.), which may be composed of one or more processors, and a memory 304b (e.g., synchronous dynamic random-access memory (DRAM), read-only memory (ROM)), which may communicate with each other via a bus (not shown). The processing device 302b includes identical or nearly identical functionality as processing device 302a in FIG. 3A, but with respect to devices and/or components of the client device 101 instead of devices and/or components of the ACCM system 104.

The memory 304b of processing device 302b stores data and/or computer instructions/code for facilitating at least some of the various processes described herein. The memory 304b includes identical or nearly identical functionality as memory 304a in FIG. 3A, but with respect to devices and/or components of the client device 101 instead of devices and/or components of the ACCM system 104.

The processing device 302b executes a client device management (CDM) agent 315 that may be configured to send a request to the ACCM system 104 for recommended configurations for network entities and/or validated configurations for network entities. The request may indicate a set (e.g., one or more) of parameters associated with one or more network entities of a computing network (e.g., a private network, a corporate network, a customer's network, a public network, and/or the like). The CDM agent 315 may be configured to receive the recommended configurations for the network entities and/or the validated configurations for the network entities from the ACCM system 104. The CDM agent 315 may be configured to receive a file including the one or more natural language strings that describes the set of parameters. The CDM agent 315 may be configured to apply the recommended configurations, the validated configurations, and/or the contents of the file to the network entities. The CDM agent 315 may be configured to display the recommended configurations, the validated configurations, and/or the contents of the file on a screen.

The client device 101 includes a network interface 306b configured to establish a communication session with a computing device for sending and receiving data over a network to the computing device. Accordingly, the network interface 306b includes identical or nearly identical functionality as network interface 306a in FIG. 3A, but with respect to devices and/or components of the client device 101 instead of devices and/or components of the ACCM system 104.

The client device 101 includes an input/output device 305b configured to receive user input from and provide information to a user. In this regard, the input/output device 305b is structured to exchange data, communications, instructions, etc. with an input/output component of the client device 101. The input/output device 305b includes identical or nearly identical functionality as input/output device 305a in FIG. 3A, but with respect to devices and/or components of the client device 101 instead of devices and/or components of the ACCM system 104.

The client device 101 includes a device identification component 307b (shown in FIG. 3B as device ID component 307b) configured to generate and/or manage a device identifier associated with the client device 101. The device ID component 307b includes identical or nearly identical functionality as device ID component 307a in FIG. 3A, but with respect to devices and/or components of the client device 101 instead of devices and/or components of the ACCM system 104.

The client device 101 includes a bus (not shown), such as an address/data bus or other communication mechanism for communicating information, which interconnects the devices and/or components of the client device 101, such as processing device 302b, network interface 306b, input/output device 305b, and device ID component 307b.

In some embodiments, some or all of the devices and/or components of the client device 101 may be implemented with the processing device 302b. For example, the client device 101 may be implemented as a software application stored within the memory 304b and executed by the processing device 302b. Accordingly, such an embodiment can be implemented with minimal or no additional hardware costs. In some embodiments, any of these above-recited devices and/or components rely on dedicated hardware specifically configured for performing operations of the devices and/or components.

Figure 3C:
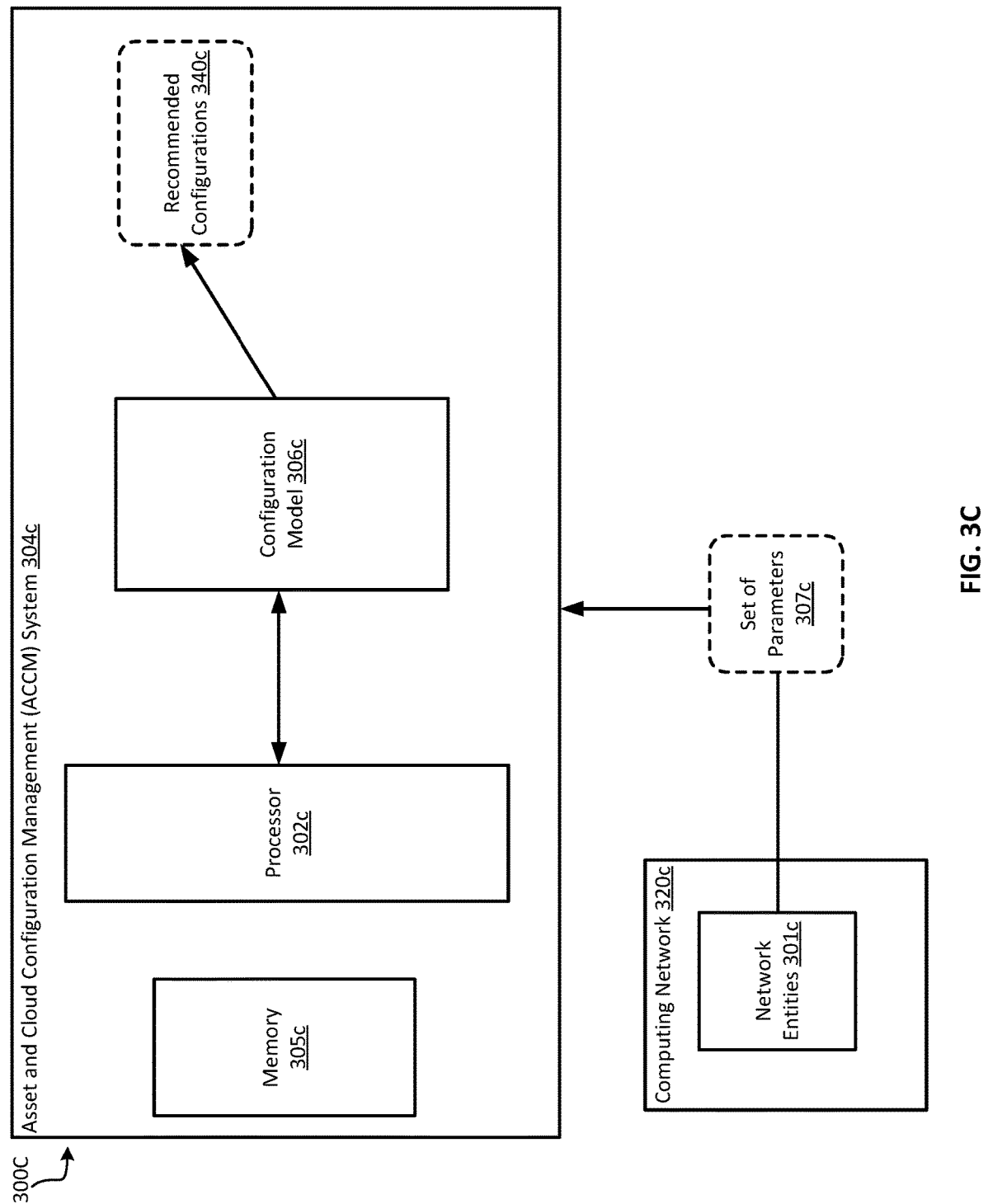
FIG. 3C is a block diagram depicting an example environment for using an ACCM system, according to some embodiments.

FIG. 3C is a block diagram depicting an example environment for using an ACCM system, according to some embodiments. The environment 300c includes an ACCM system 304c that may be configured to include one or more of the components and/or features of the ACCM system 104 in FIG. 1. The ACCM system 304c includes a memory 305c and a processing device 302c that is operatively coupled to the memory 305c. The processing device 302c may be configured to acquire a set of parameters 307c associated with one or more network entities 301c of a computing network 320c. The processing device 302c may be configured to provide the set of parameters 307c to a configuration model 306c trained to generate, based on semantic matching, recommended configurations for network entities and validated configurations for the network entities. The processing device 302c may be configured to generate, using the configuration model 306c, one or more recommended configurations 340c for the one or more network entities 301c based on the set of parameters 307c.

FIG. 4 is a flow diagram depicting a method of using generative artificial intelligence (AI), such as large language models (LLMs), to recommend and validate asset and/or cloud configurations. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by an asset and cloud configuration management system, such as the ACCM system 104 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

The method 400 includes the block 402 of using generative artificial intelligence to recommend and validate asset and/or cloud configurations. The method 400 includes the block 404 of providing the set of parameters to a configuration model trained to generate, based on semantic matching, recommended configurations for network entities. The method 400 includes the block 406 of generating, by a processing device using the configuration model, one or more recommended configurations for the one or more network entities based on the set of parameters.

Figure 5:
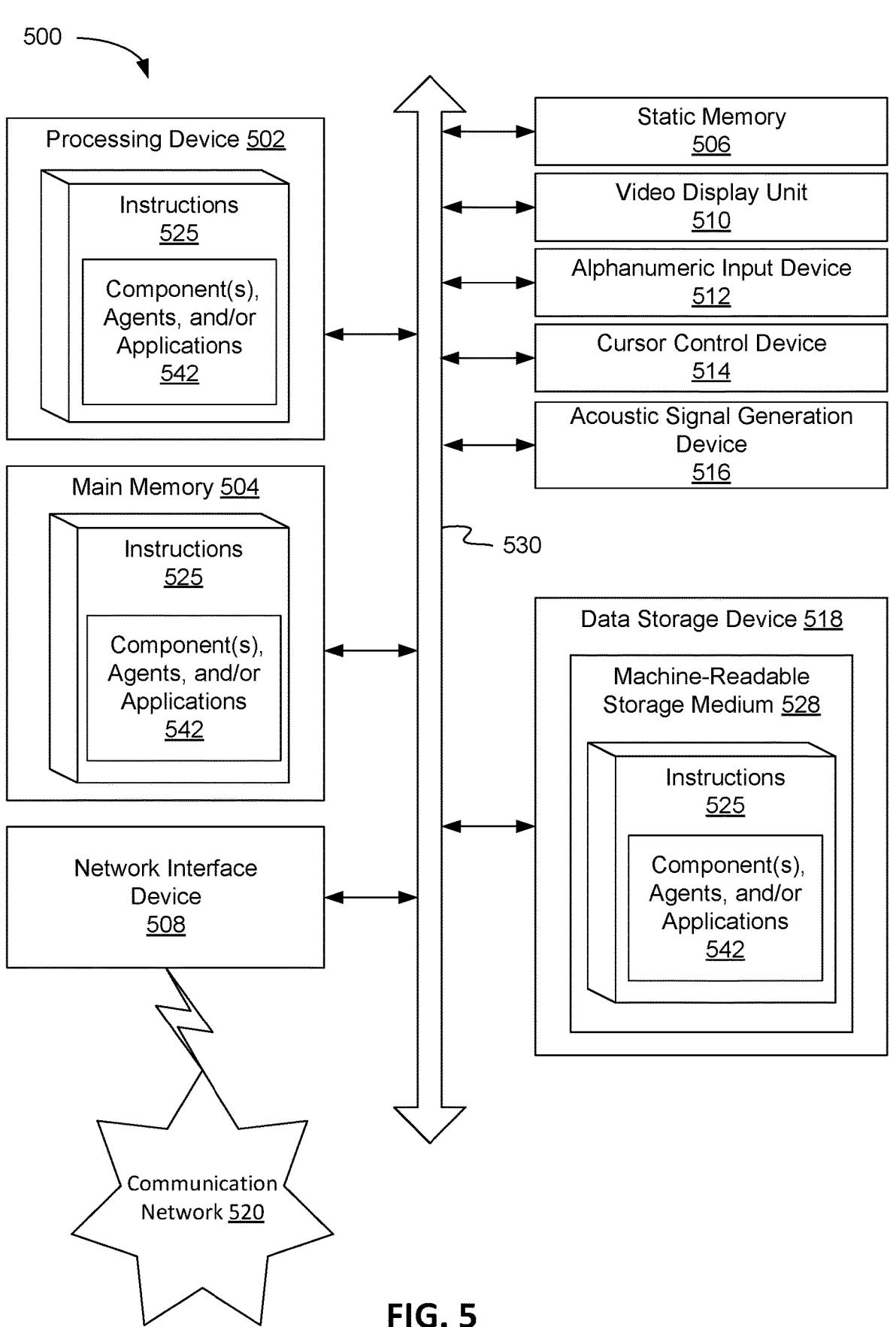
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components/programs/applications 542 (e.g., ACCM agent 105, configuration model 106 in FIG. 1, etc.) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "acquiring," "providing," "generating," "determining," "receiving," "identifying," "selecting," "condensing," "indicating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
receiving, from a client device, a set of parameters associated with one or more network entities of a computing network;
providing the set of parameters to a configuration model trained to determine a misconfiguration of network entities are misconfigured and generate, based on semantic matching, recommended configurations for the network entities;
generating, by a processing device and using the configuration model and a particular historical configuration associated with the network entities, one or more recommended configurations for the one or more network entities based on the set of parameters by identifying a plurality of historical configurations previously generated by a plurality of client devices and determining that the particular historical configuration of the plurality of historical configurations was previously generated by the client device;
validating, by the processing device, each of the one or more recommended configurations using the configuration model of the computing network to determine whether application of the recommended configuration resolves the misconfiguration without introducing an additional policy violation;
selecting, as the one or more recommended configurations to be provided, only those recommended configurations that satisfy the validation; and
providing the one or more recommended configurations to the client device to be used by the client device to replace the misconfiguration of the network entities with the one or more recommended configurations.

2. The method of claim 1, wherein the set of parameters comprises at least one of a network rule, a network configuration, or a network policy.

3. The method of claim 1, wherein generating, by the processing device using the configuration model, the one or more recommended configurations for the one or more network entities based on the set of parameters comprises:
determining a desired outcome based on the set of parameters;
determining a plurality of actions to cause the desired outcome; and
identifying a subsequent action of the plurality of actions based on a chronological order,
wherein the one or more recommended configurations indicate the subsequent action.

4. The method of claim 1, wherein generating, by the processing device using the configuration model, the one or more recommended configurations for the one or more network entities based on the set of parameters comprises:
identifying a pool of configuration rules for one or more policies; and
selecting, from the pool of configuration rules, a best configuration rule for the one or more policies.

5. The method of claim 1, wherein generating, by the processing device using the configuration model, the one or more recommended configurations for the one or more network entities based on the set of parameters comprises:
condensing the set of parameters into fewer parameters indicative of the set of parameters, wherein the one or more recommended configurations indicate the fewer parameters.

6. The method of claim 1, wherein generating, by the processing device using the configuration model, the one or more recommended configurations for the one or more network entities based on the set of parameters comprises:
generating one or more natural language strings describing the set of parameters.

7. The method of claim 6, further comprising:
generating a file comprising the one or more natural language strings; and
providing the file to the client device.

8. The method of claim 1, further comprising:
providing a different set of parameters to the configuration model; and
generating, using the configuration model, a model output indicating whether the different set of parameters achieve a desired objective.

9. The method of claim 8, wherein generating, using the configuration model, the model output further comprises:
determining, using the configuration model, whether the different set of parameters achieve the desired objective; and either:
indicating, in the model output, that the different set of parameters is a valid configuration responsive to determining that the different set of parameters achieve the desired objective; or
indicating, in the model output, that the different set of parameters is an invalid configuration responsive to determining that the different set of parameters fail to achieve the desired objective.

10. The method of claim 8, further comprising:
generating a reason for why the configuration model generated the one or more recommended configurations.

11. A system comprising:
a memory; and a processing device, operatively coupled to the memory, to:

receiving, from a client device, a set of parameters associated with one or more network entities of a computing network;

provide the set of parameters to a configuration model trained to determine a misconfiguration of network entities are misconfigured and generate, based on semantic matching, recommended configurations for network entities;

generate, using the configuration model and a particular historical configuration associated with the network entities, one or more recommended configurations for the one or more network entities based on the set of parameters by identifying a plurality of historical configurations previously generated by a plurality of client devices and determining that the particular historical configuration of the plurality of historical configurations was previously generated by the client device;

validate, by the processing device, each of the one or more recommended configurations using the configuration model of the computing network to determine whether application of the recommended configuration resolves the misconfiguration without introducing an additional policy violation;

select, as the one or more recommended configurations to be provided, only those recommended configurations that satisfy the validation; and provide the one or more recommended configurations to the client device to be used by the client device to replace the misconfiguration of the network entities with the one or more recommended configurations.

12. The system of claim 11, wherein the set of parameters comprises at least one of a network rule, a network configuration, or a network policy.

13. The system of claim 11, wherein to generate, using the configuration model, the one or more recommended configurations for the one or more network entities based on the set of parameters, the processing device is further to:

determine a desired outcome based on the set of parameters;

determine a plurality of actions to cause the desired outcome; and identify a subsequent action of the plurality of actions based on a chronological order, wherein the one or more recommended configurations indicate the subsequent action.

14. The system of claim 11, wherein to generate, using the configuration model, the one or more recommended configurations for the one or more network entities based on the set of parameters, the processing device is further to:

identify a pool of configuration rules for one or more policies; and select, from the pool of configuration rules, a best configuration rule for the one or more policies.

15. The system of claim 11, wherein to generate, by the processing device using the configuration model, the one or more recommended configurations for the one or more network entities based on the set of parameters, the processing device is further to:

condense the set of parameters into fewer parameters indicative of the set of parameters, wherein the one or more recommended configurations indicate the fewer parameters.

16. The system of claim 11, wherein to generate, using the configuration model, the one or more recommended configurations for the one or more network entities based on the set of parameters, the processing device is to:

generate one or more natural language strings describing the set of parameters.

17. The system of claim 16, wherein the processing device is further to:

generate a file comprising the one or more natural language strings; and provide the file to the client device.

18. The system of claim 11, wherein the processing device is further to:

provide a different set of parameters to the configuration model;

generate, using the configuration model, a model output indicating whether the different set of parameters achieve a desired objective; and generating a reason for why the configuration model generated the one or more recommended configurations.

19. The system of claim 18, wherein to generate, using the configuration model, the model output, the processing device is further to:

determine, using the configuration model, whether the different set of parameters achieve the desired objective; and either:

indicate, in the model output, that the different set of parameters is a valid configuration responsive to determining that the different set of parameters achieve the desired objective; or indicate, in the model output, that the different set of parameters is an invalid configuration responsive to determining that the different set of parameters fail to achieve the desired objective.

20. A non-transitory computer-readable medium storing instructions that, when execute by a processing device, cause the processing device to:

receive, from a client device, a set of parameters associated with one or more network entities of a computing network;

provide the set of parameters to a configuration model trained to determine a misconfiguration of network entities are misconfigured and generate, based on semantic matching, recommended configurations for network entities;

generate, by the processing device and using the configuration model and a particular historical configuration associated with the network entities, one or more recommended configurations for the one or more network entities based on the set of parameters by identifying a plurality of historical configurations previously generated by a plurality of client devices and determining that the particular historical configuration of the plurality of historical configurations was previously generated by the client device;

validate, by the processing device, each of the one or more recommended configurations using the configuration model of the computing network to determine whether application of the recommended configuration resolves the misconfiguration without introducing an additional policy violation;

select, as the one or more recommended configurations to be provided, only those recommended configurations that satisfy the validation; and provide the one or more recommended configurations to the client device to be used by the client device to replace the misconfiguration of the network entities with the one or more recommended configurations.

* * * * *